United States Patent
Ishihara

(10) Patent No.: US 7,412,184 B2
(45) Date of Patent: *Aug. 12, 2008

(54) USER INTERFACE FOR IMAGE FORMING APPARATUS

(75) Inventor: Atsushi Ishihara, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/765,186

(22) Filed: Jun. 19, 2007

(65) Prior Publication Data

US 2007/0237538 A1 Oct. 11, 2007

Related U.S. Application Data

(63) Continuation of application No. 10/624,045, filed on Jul. 21, 2003, now Pat. No. 7,305,199.

(60) Provisional application No. 60/447,158, filed on Feb. 12, 2003.

(51) Int. Cl.
*G03G 15/00* (2006.01)

(52) U.S. Cl. ........................... 399/81; 399/13; 399/110

(58) Field of Classification Search ................... 399/1, 399/13, 81, 110
See application file for complete search history.

(56) References Cited

U.S. PATENT DOCUMENTS

| 5,091,746 | A | * | 2/1992 | Watanabe | 399/1 |
| 5,543,897 | A | * | 8/1996 | Altrieth, III | 399/81 |
| 5,937,232 | A | * | 8/1999 | Taguchi et al. | 399/81 |

FOREIGN PATENT DOCUMENTS

| JP | 06-164812 | | 11/1992 |
| JP | 06-253084 | | 2/1993 |
| JP | 2002014800 | A | 1/2002 |
| JP | 2002014800 | A * | 1/2002 |

* cited by examiner

*Primary Examiner*—David M. Gray
*Assistant Examiner*—Laura K Roth
(74) *Attorney, Agent, or Firm*—SoCal IP Law Group LLP; Steven C. Sereboff; John E. Gunther

(57) ABSTRACT

There is disclosed an image forming apparatus that has two operation panels—a standard operation panel and an optional operation panel. The image forming apparatus has a standard mode and a professional mode which provide different displays on the operation panels. In addition, custom displays may be stored and recalled by the users.

11 Claims, 11 Drawing Sheets

[Operation Guidance]

- To make a copy
  ........................................................
  ........................................................
  ........................................................

- To send FAX
  ........................................................
  ........................................................
  ........................................................

- To print
  ........................................................
  ........................................................
  ........................................................

USER INTERFACE FOR IMAGE FORMING APPARATUS

RELATED APPLICATION INFORMATION

This application claims priority from application Ser. No. 10/624,045, filed Jul. 21, 2003 entitled "Display Control Apparatus for Image Forming Apparatus," now U.S. Pat. No. 7,305,199 B2, which claims priority to Provisional Application No. 60/447,158, filed Feb. 12, 2003 entitled "Display Control Apparatus for Image Forming Apparatus," which application is incorporated herein by reference.

BACKGROUND OF THE INVENTION

1. Field of the Invention

The present invention relates to operation panels of image forming apparatuses that have functions such as a copying machine function, a printer function, a fax machine function etc.

2. Description of Related Art

Conventionally, in a compound machine that has a copy machine function, a printer function, and a fax machine function, there has been a technique to enable another operation panel that is loaded as optional equipment to operate in conjunction with an operation panel that is included as standard equipment when such an optional operation panel is loaded. Also, there has been a technique to display detailed description of functions that are configured when various settings are set through the operation panel of a copy machine to which an information equipment that has a display function is connected.

However, aforementioned conventional equipment can display only items and contents that are predefined such as print menu list and detailed description of functions when another panel is loaded as extended equipment.

Therefore, selecting menu items can be difficult for users who do not have enough understanding of the functions of the image forming apparatus because information necessary for them may not be displayed, or, on the other hand, selecting menu items each time could be bothersome for users who often use the image forming apparatus and have a lot of knowledge on its functions because totally unnecessary information for them may be displayed. As described above, there have been various problems depending on the users' level of knowledge on the operation of the image forming apparatus.

DETAILED DESCRIPTION OF THE INVENTION

Throughout this description, the embodiments and examples shown should be considered as exemplars, rather than limitations on the apparatus and methods of the present invention.

This invention provides an image forming apparatus that has an operation panel suitable for various users in an image forming apparatus that has a second operation panel, and the operationally of the image forming apparatus for the users can be improved.

Description of the System

Figure 1:
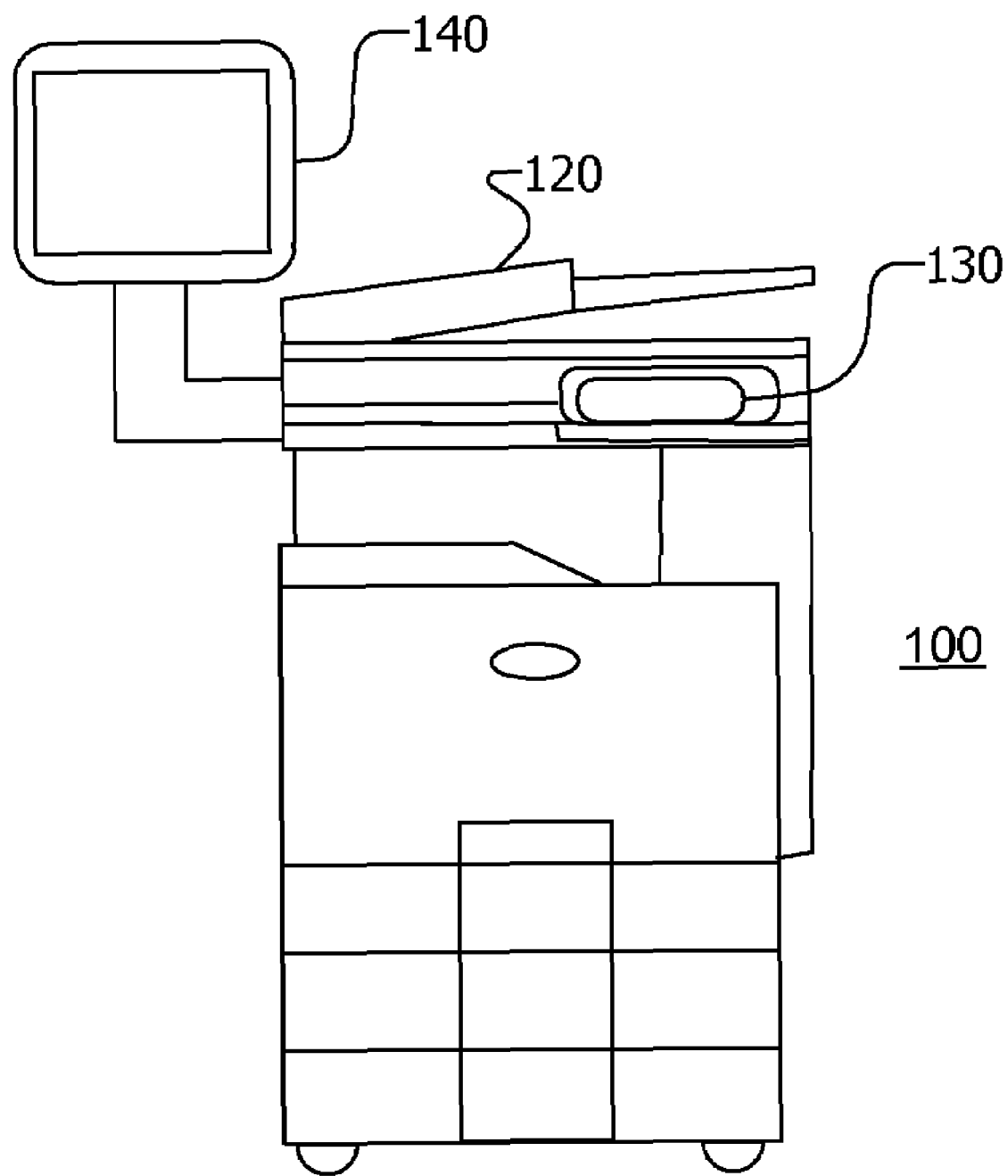
FIG. 1 is a frontal outline view of an image forming apparatus in accordance with the invention.

Referring now to FIG. 1, there is shown a frontal outline view of an image forming apparatus 100 in accordance with the invention. As used herein, an "image forming apparatus" is a unitary electronic device which forms images into media. An image forming apparatus may be, for example, a copier, fax, printer or multi-function peripheral (MFP). The image forming apparatus may form the image on such media as paper or overhead transparencies. The image forming apparatus 100 comprises an input feeder 120, an operation element 130 and an optional operation panel 140. The operation element 130 is for users to operate the image forming apparatus 100. The optional operation panel 140 can be loaded and unloaded to/from the image forming apparatus as an optional component.

Figure 2:
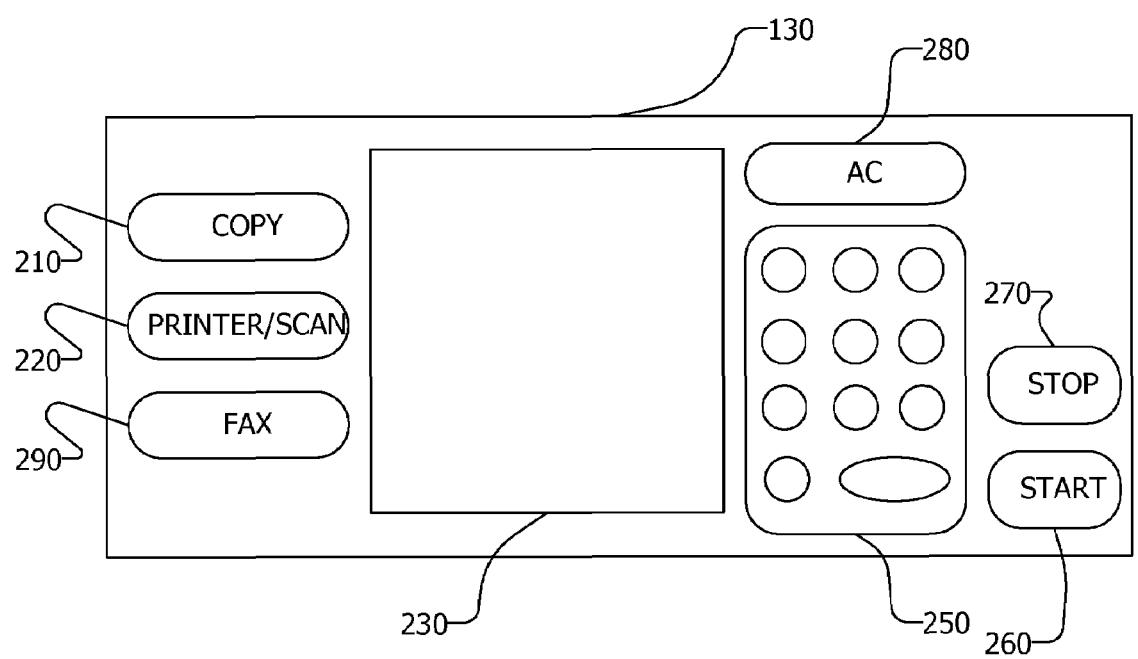
FIG. 2 is an operation element of the image forming apparatus of FIG. 1.

Referring now to FIG. 2, there is shown the operation element 130. The operation element 130 comprises a copy key 210, a printer/scan key 220, a fax key 290, a standard operation panel 230, a numeric keypad 250, a start key 260, a stop key 270 and an all clear key 280. The copy key 210 allows the user to select the copy machine function. The printer/scan key 220 allows the user to select the printer or scan functions. The fax key 290 allows the user to select the fax machine function. The standard operation panel 230 is included as standard equipment.

Figure 3:
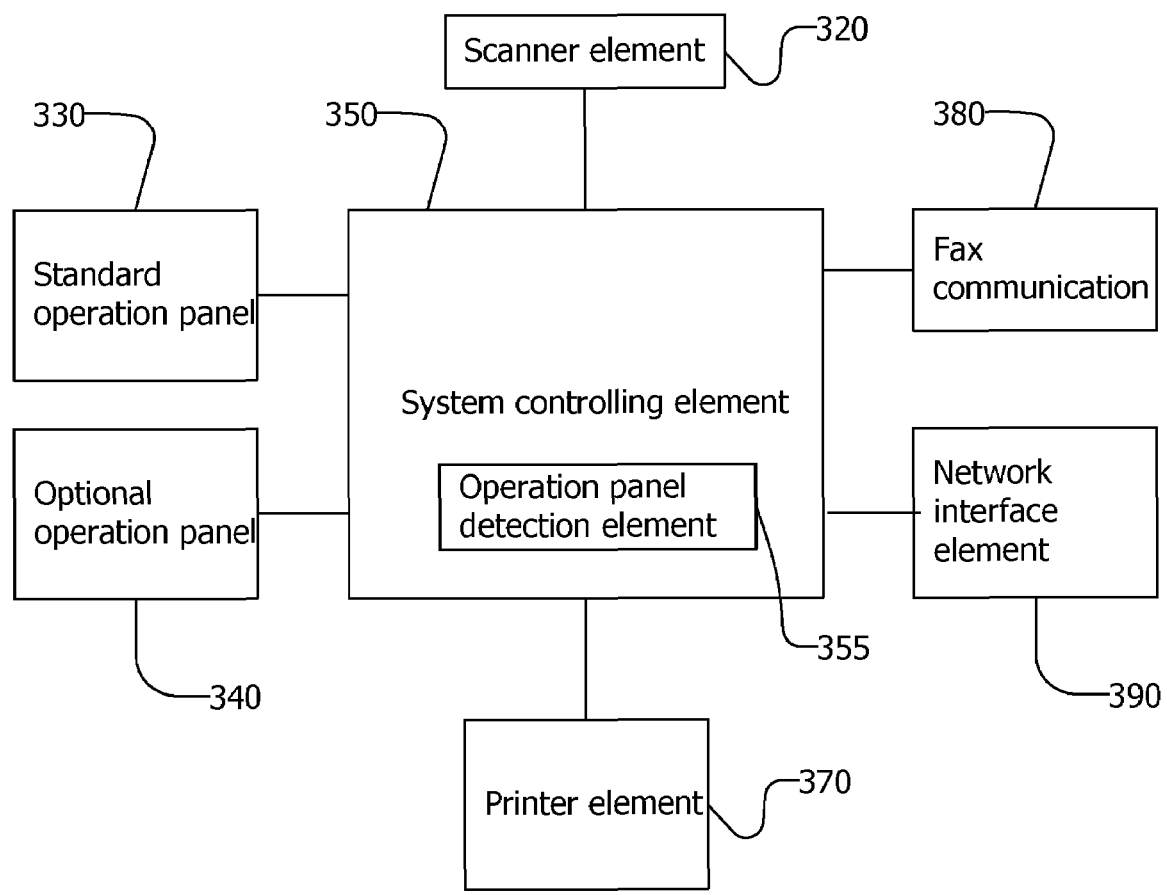
FIG. 3 is a block diagram of the functional elements of an image forming apparatus in accordance with the invention.

Referring now to FIG. 3, there is shown a block diagram of the functional elements of the image forming apparatus 100. The functional elements include a scanner element 320, a fax communication element 380, a network interface element 390, a standard operation panel element 330, an optional operation panel element 340, a system controlling element 350 and a printer element 370.

The scanner element 320 reads original images.

The fax communication element 380 receives data that is sent from external communication equipment connected through a telephone line and sends image data that is read from the scanner element 320 to external equipment.

The network interface element 390 receives print data from external electronic equipment such as a personal computer that is attached to a network and sends image data that is read from the scanner element 320 to external electronic equipment.

Users may input operations to the standard operation panel 230 for functions of the image forming apparatus 100.

The system controlling element 350 controls each element of the image forming apparatus 100. The system controlling element 350 generates print data by editing (image processing such as scaling and rotating, or editing such as double-side printing and scaling) image data read from the scanner element 320, communication data received by the fax communication element 380, or print data received by the network interface element 390. The operation of the system controlling element 350 element may be determined according to the operations from the operation element 130 (FIG. 1) or optional operation panel 140 (FIG. 1).

Also, the system controlling element 350 has an operation panel detection element 360 to detect whether the optional operation panel 140 is loaded or not, or available.

The printer element 370 outputs print data generated by the system controlling element 350.

Description of the Methods

Figure 4:
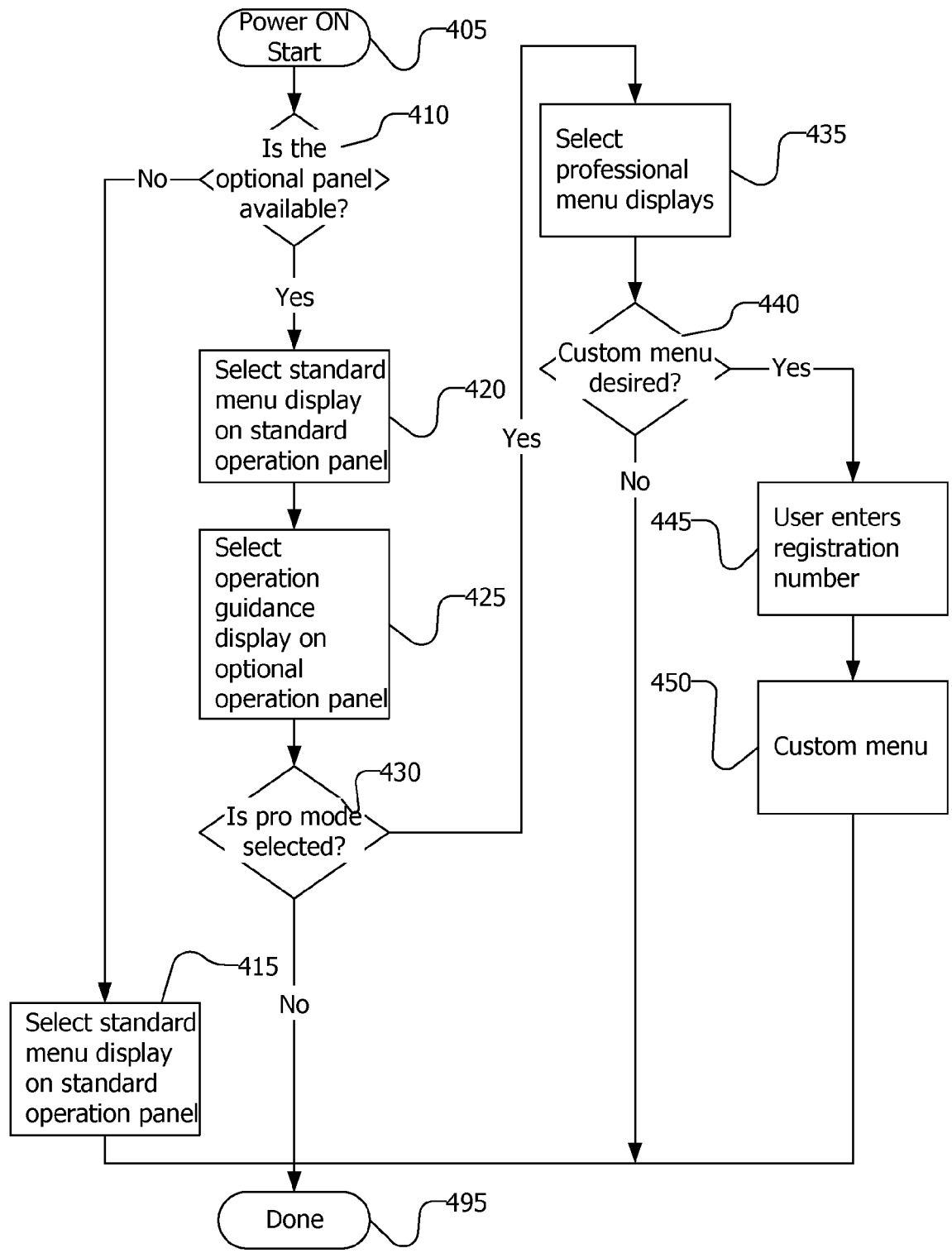
FIG. 4 is a flow chart of a method in accordance with the invention.

Referring now to FIG. 4, there is shown a flow chart of a method in accordance with the invention. References to the image forming apparatus, however, may be to FIGS. 1-3. Initially, the image forming apparatus is turned on (step 405). Next, the operation panel detection element 355 detects whether the optional operation panel 140 is available (e.g., loaded or not) (step 410).

Figure 5:
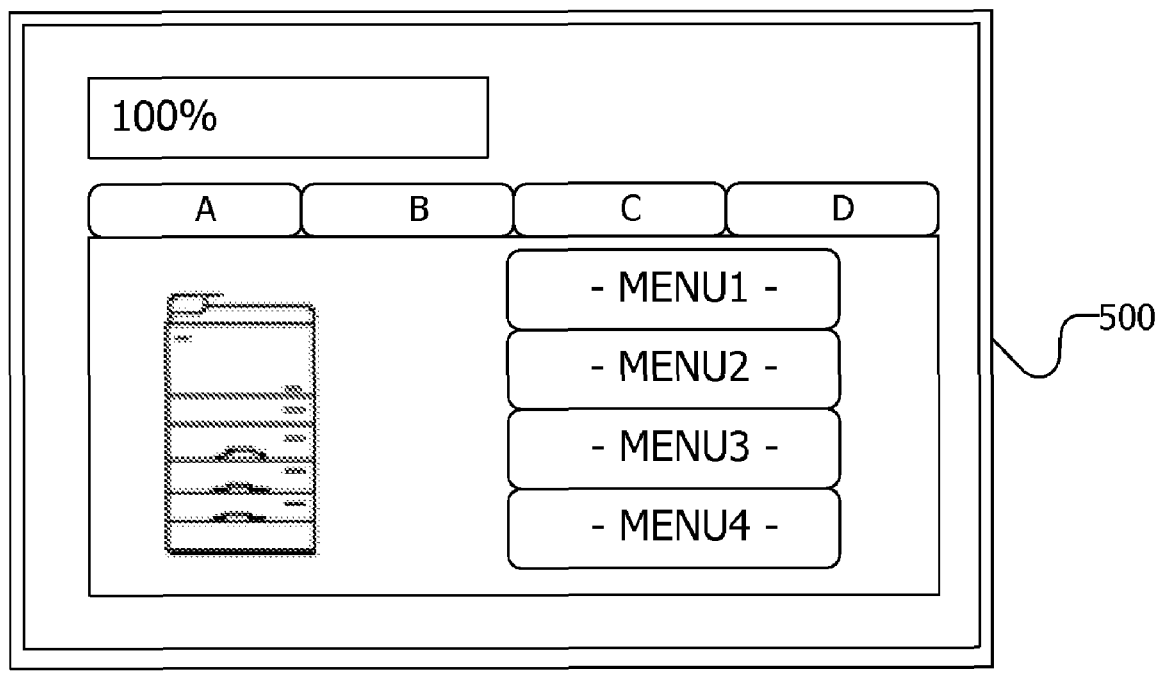
FIG. 5 is a first standard menu display in accordance with one aspect of the invention.

If the optional operation panel 140 is not available, then a first standard menu display 500 shown in FIG. 5 is displayed on the standard operation panel 230 (step 415). The first standard menu display 500 is a fixed display screen that is predefined and stored in the image forming apparatus 100. Next, the image forming apparatus 100 waits for panel operation by users (step 495). The image forming apparatus 100 may be configured so that it selects the copy machine function by default when it is turned on, so the first standard menu display 500 of the standard operation panel 230 displays a general menu display to operate the image forming apparatus 100. For example, MENU1-4 in FIG. 5 may comprise a button to select a scaling function (MENU1), a button to specify one-sided or double-sided printing (MENU2), a button to set sorting and stapling (MENU3), and a button to set the density of the copied image (MENU4).

Figure 8:
FIG. 8 is a standard display on an optional operation panel in accordance with one aspect of the invention.

On the other hand, when the optional operation panel 140 is available, a different second standard menu display 600 (FIG. 6) may be displayed on the standard operation panel 130 (step 420). The second standard menu display 600 is based upon the first standard menu display 500 shown in FIG. 5. However, the second standard menu display 600 includes a professional mode button 610 to select the professional mode and may include a standard mode button 620 to select the standard mode. The second standard menu display 600 has at least a button to select professional mode or standard mode adding to the first standard menu display 500. MENU1-4 in the second standard menu display 600 may display the same contents as MENU1-4 in the first standard menu display 500. The optional operation panel 140, in standard mode, may display detailed guidance such as that shown in FIG. 8 according to the function selected by the user on the operation element 130 (step 425).

After loading the standard operation panel 230 and the optional operation panel 140, the image forming apparatus 100 detects whether professional mode is selected (step 430). The system controlling element (350) may perform this step 430. The selection may be made by the user on the second standard menu display 600 that is displayed on the standard operation panel 230. If mode selection is not done or the standard mode is selected, both the standard operation panel 230 and optional operation panel 140 maintain the screens that were displayed in steps 420, 425, and wait for panel operation by users (step 495).

Figure 7:
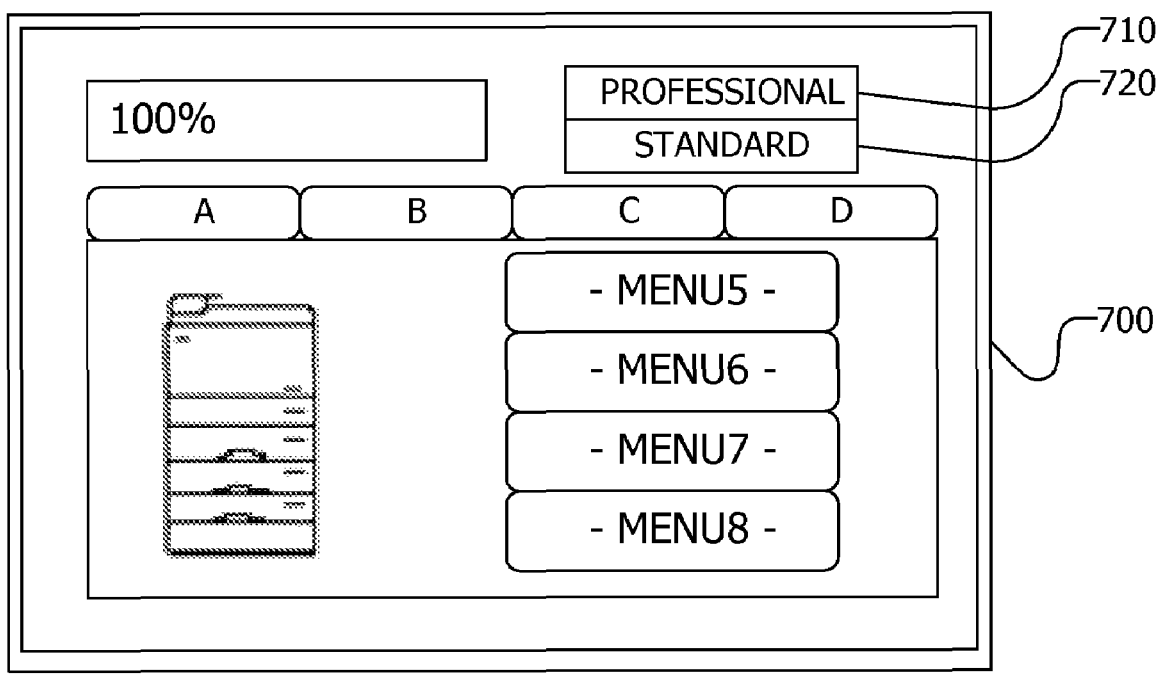
FIG. 7 is a professional initial screen display in accordance with the invention.

On the other hand, if the professional mode is selected in step 430, the display of the standard operation panel 230 is switched to a professional initial screen display, such as the display 700 shown in FIG. 7 (step 435). The professional initial screen display 700 may comprise a pre-registered menu that corresponds to the professional mode. For example, multiple functions of MENU1-4 of the standard menu display may be combined and pre-registered to MENU5-8 of the display 700. MENU5 may be pre-registered to A4+one-sided printing+sorting. MENU6 may be pre-registered to A4+double-side printing+sorting. MENU7 may be pre-registered to A4+one-sided printing+sorting+stapling. MENU8 may be pre-registered to A4+double-sided printing+sorting+stapling.

Figure 9:
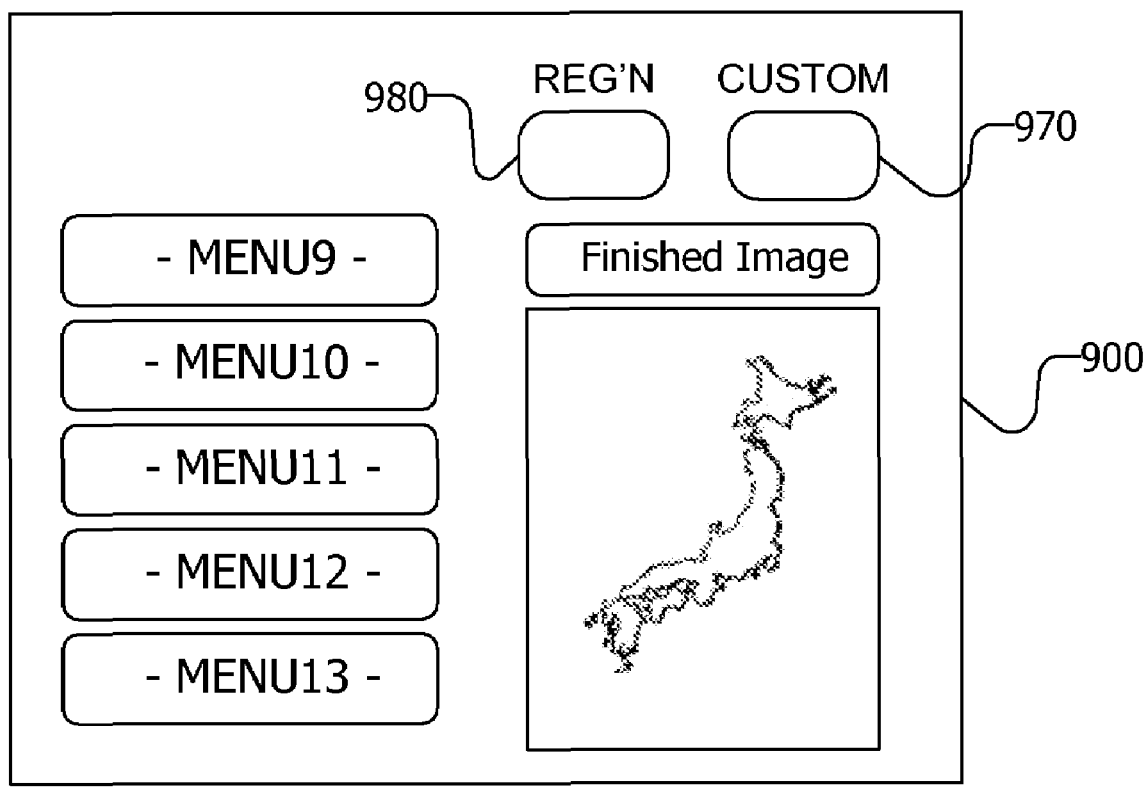
FIG. 9 is a professional initial screen display on the optional operation panel in accordance with another aspect of the invention.

Also in step 435, a professional initial screen display for the optional operation panel side 140 may displayed, such as the display 900 shown in FIG. 9. The professional initial screen display 900 may have a custom button 970 and a registration-calling button 980. The professional initial screen display 900 on the optional operation panel 140 may provide additional settings, such as settings MENU9-MENU13 shown in FIG. 9. MENU9 may be pre-registered to A4+one-sided printing+2-in-1+sorting. MENU10 may be pre-registered to A4+double-sided printing+2-in-1+sorting. MENU11 may be pre-registered to A4+one-sided printing+2-in-1+sorting+stapling function. MENU12 may be pre-registered to A4+double-sided+printing+2-in-1+sorting+stapling. MENU13 may be pre-registered to A4+one-sided+4-in-1+sorting.

The custom button 970 may have a function to register a series of operations that a user actually used to operate the image forming apparatus 100 as a menu item. The user may be asked if he/she wants to register the series of functions set at that point to an empty menu item. If so, then the series of functions set at that point may be stored in an unused menu item, or may overwrite a used menu item.

The registration-calling button 980 may be used to load private or custom display screen data, such as that created using the custom button 970. The private or custom display screen data may be stored on a per-user basis, and may be stored in memory in the image forming apparatus 100 or outside the image forming apparatus 100. The private or custom display screen data may include one or more pre-defined often-used settings, so that a user can use the image forming apparatus to make a copy or perform another function easily without specifying complicated settings each time.

If the user does not desire that private or custom display screen data be used (step 440), then the image forming apparatus 100 waits for panel operation by users (step 495).

Figure 10:
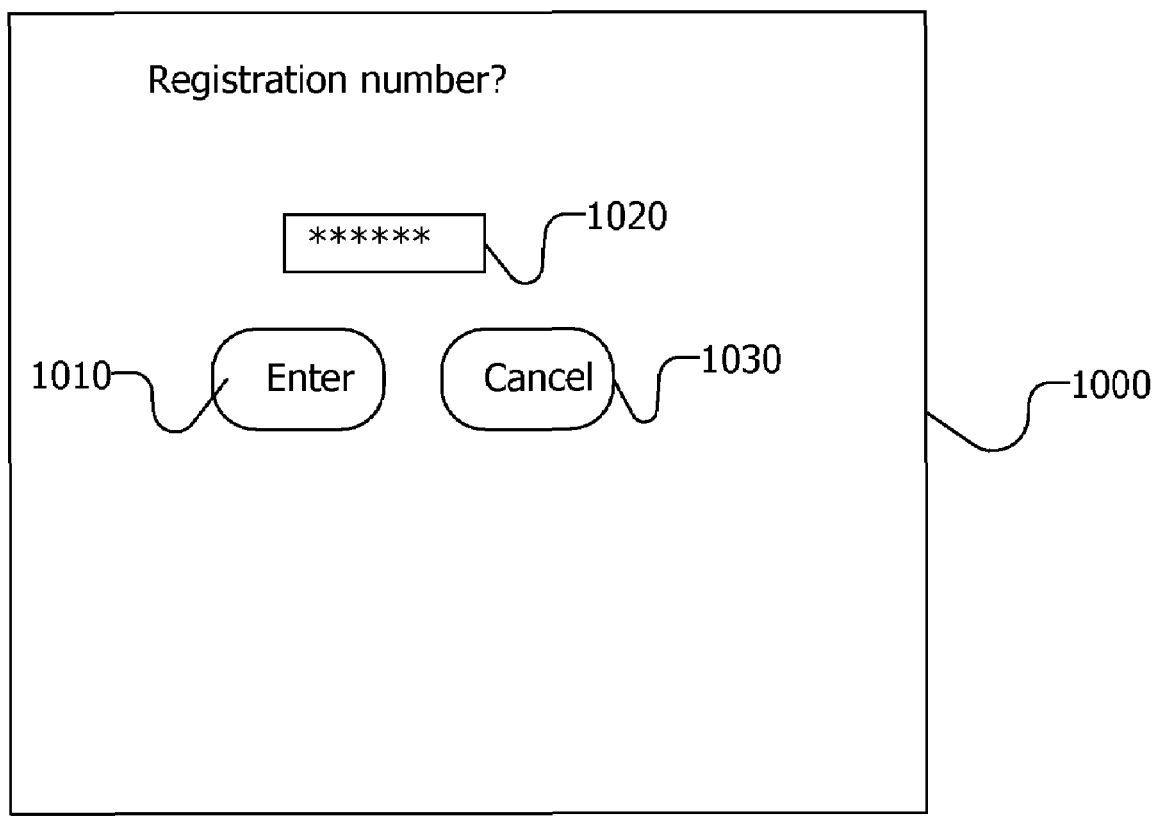
FIG. 10 is a registration number input display in accordance with the invention.

If the user selects the custom button 970 (step 440), then a registration number input display 1000 (FIG. 10) may be displayed. From this display 1000, the user may input a registration code (step 445). The registration code may be entered using the numeric keypad 250 (FIG. 2). Next, a private or custom display screen data corresponding to the registration code may be retrieved and displayed (step 450). The private or custom display screens may be shown on the standard operation panel 230 and/or the optional operation panel 140. Next, the image forming apparatus 100 waits for panel operation by users (step 495).

Figure 11:
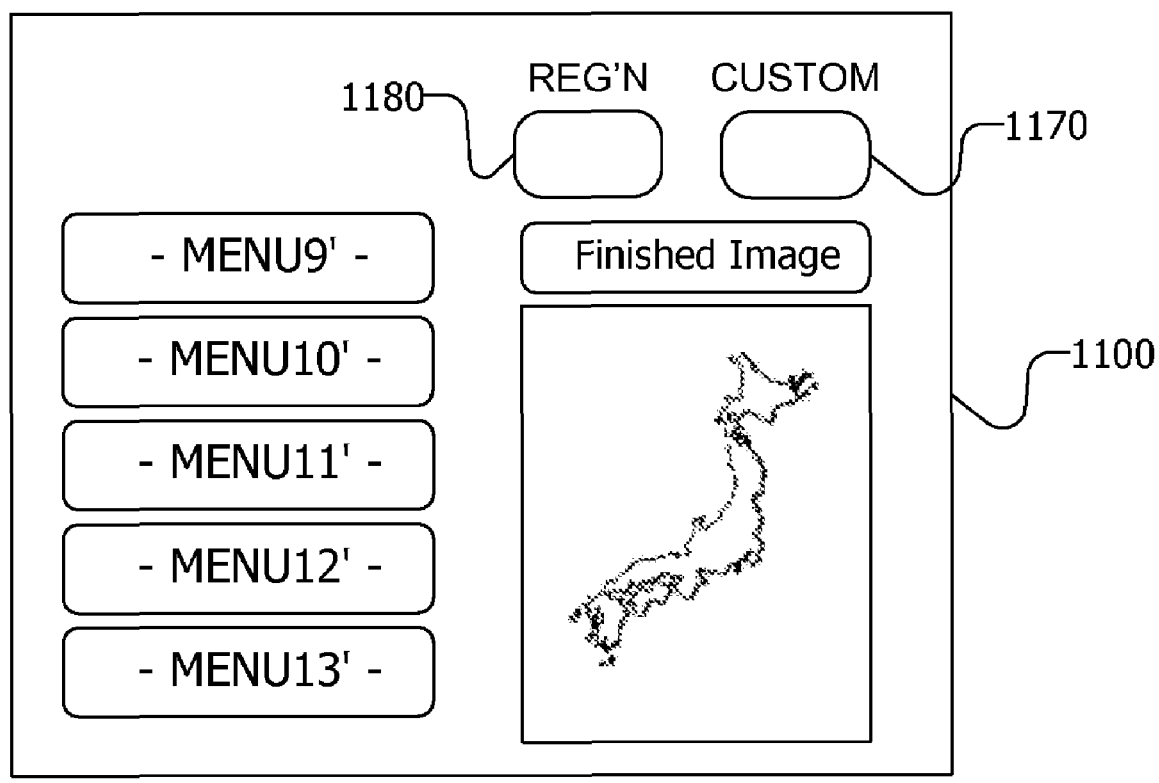
FIG. 11 is a user registration display in accordance with the invention.

A custom display for the optional operation panel 140 may include settings such as settings MENU9'-MENU13' shown in FIG. 11. Some buttons, such as MENU 12' and MENU 13', may be unused (i.e., not set by the user) and empty.

Figure 6:
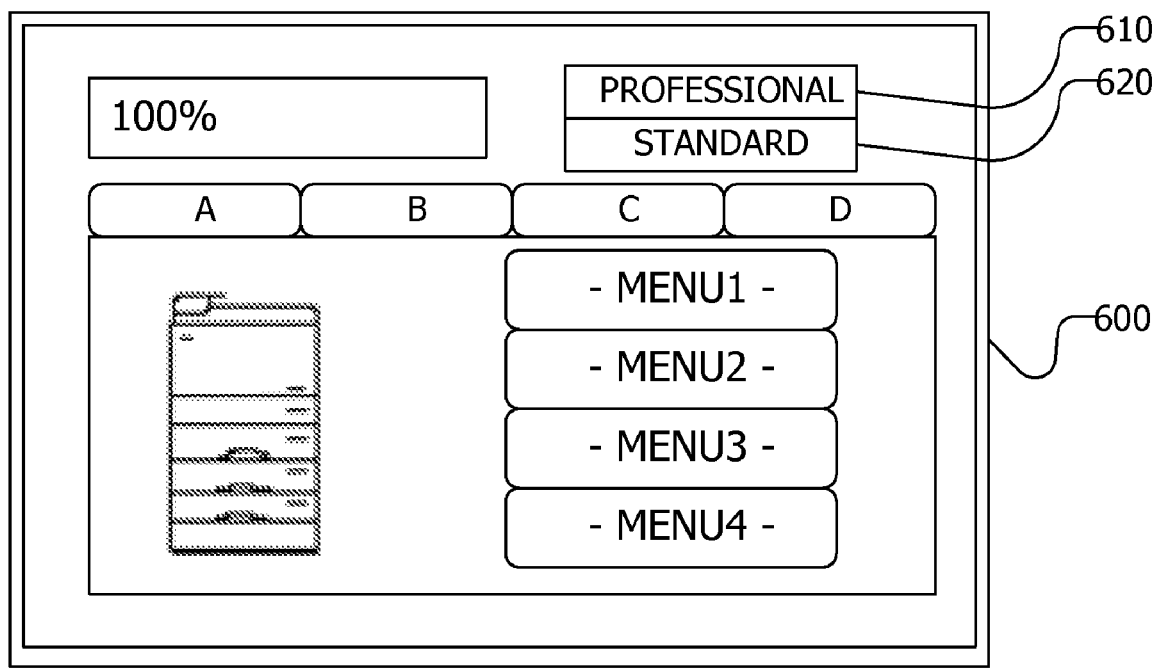
FIG. 6 is a second standard menu display in accordance another aspect of the invention.

After the professional mode is selected in step 430, if a predefined time elapses after the last operation by the user or the user pushes the standard mode button 720 (FIG. 7), the display may be switched back to the second standard menu display 600 (FIG. 6).

The MENU buttons shown in FIGS. 5, 6, 7, 9 and 11 may be configured so that by pressing each of them the function of the image forming apparatus is changed to the settings registered to the corresponding MENU, but the settings can be changed freely until the start key 260 (FIG. 2) is pressed.

Also, operations and operation screen display when the copy machine function of the image forming apparatus is selected is described above as an embodiment of this invention, but it is also possible to configure the image forming apparatus so that display screens for standard mode and professional mode can be switched when printer/scan function or fax machine function is selected.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

The invention claimed is:

1. A display control apparatus for an image forming apparatus comprising:
    a first operation panel with which operators can select multiple functions of an image forming apparatus;
    a second operation panel that is configured so that it can be loaded and unloaded freely to/from the image forming apparatus and with which operators can select multiple functions;
    a detection means to detect whether the second operation panel is loaded or not when the image forming apparatus is turned on; and
    a controlling means that controls items that are displayed on the first operation panel according to the result of detection by the detection means, including adding to the display items on the first display a mode button that can switch a display of items on the second operation panel.

2. A method of providing user interface displays in an image forming apparatus, the image forming apparatus having a first display device and a second display device, the method comprising:
    providing a first standard user interface to the first display device, the first standard user interface including an option for the user to select an advanced interface;
    determining if the second display device is available, and if so then providing an operation guidance interface to the second display device;
    if a user selects the option for the advanced interface, then providing the advanced interface to the first display device and the second display device;
    if the second display device is not available, then providing a second standard interface to the first display device;
    wherein the first standard interface includes an option for the user to select a different interface and the second standard interface lacks an option for the user to select a different interface.

3. The method of providing user interface displays in an image forming apparatus of claim 2, wherein the advanced interface includes an option for the user to select a custom interface and the standard interface lacks an option for the user to select a custom interface.

4. The method of providing user interface displays in an image forming apparatus of claim 3 further comprising, if the user selects the option for the custom interface, then providing the custom interface to the first display device and the second display device.

5. An image forming apparatus comprising:
    a first, standard display device;
    a second, optional display device that is configured so that it can be loaded and unloaded freely;
    a controller for:
        testing if the second, optional display device is available,
        if the second, optional display device is available, then providing a first standard user interface to the first display device and an operation guidance interface to the second display device, wherein the first standard user interface includes predefined display items;
        adding to the predefined display items at least a mode button that can switch the display of items on the second display device when the second display device is available;
        if a user selects the mode button, then providing a different interface to the first display device and the second display device;
        if the second, optional display is not available, then providing a second standard interface to the first display device.

6. The image forming apparatus of claim 5, wherein the different interface comprises an advanced interface.

7. The image forming apparatus of claim 6, wherein the advanced interface includes an option for the user to select a custom interface.

8. The image forming apparatus of claim 7, the controller further for detecting if the user selects the option for the custom interface, and if so then providing the custom interface to at least the first display device.

9. An image forming apparatus comprising:
    a first display device;
    a second, optional display device;
    a controller for:
        determining if the second, optional display device is available,
        providing a first standard interface to the first display device, the first standard interface including an option for the user to select an advanced interface,
        providing an operation guidance interface to the second, optional display device if the second, optional display device is available,
        determining if a user has selected the option for the advanced interface, and if so, then providing the advanced interface to the first display device
        if the second, optional display device is not available, then providing a second standard interface to the first display device;
    wherein the first standard interface includes an option for the user to select a different interface and the second standard interface lacks an option for the user to select a different interface.

10. The image forming apparatus of claim 9, wherein the advanced interface includes an option for the user to select a custom interface and the standard interface lacks an option for the user to select a custom interface.

11. The image forming apparatus of claim 10 further comprising, if the user selects the option for the custom interface, then providing the custom interface to the first display device and the second display device.

* * * * *